(12) United States Patent
Hilpert et al.

(10) Patent No.: US 6,453,282 B1
(45) Date of Patent: Sep. 17, 2002

(54) METHOD AND DEVICE FOR DETECTING A TRANSIENT IN A DISCRETE-TIME AUDIOSIGNAL

(75) Inventors: Johannes Hilpert, Fürth (DE); Jürgen Herre, Buckendorf (DE); Bernhard Grill, Lauf (DE); Rainer Buchta, Herzogenaurach (DE); Karlheinz Brandenburg, Erlangen (DE); Heinz Gerhäuser, Waischenfeld (DE)

(73) Assignee: Fraunhofer-Gesellschaft Zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/424,596

(22) PCT Filed: Jun. 15, 1998

(86) PCT No.: PCT/EP98/03603

§ 371 (c)(1),
(2), (4) Date: Nov. 24, 1999

(87) PCT Pub. No.: WO99/10886

PCT Pub. Date: Mar. 4, 1999

(30) Foreign Application Priority Data

Aug. 22, 1997 (DE) ........................................ 197 36 669

(51) Int. Cl.[7] .......................... G10L 19/00; G10L 19/06; G10L 19/12; G10L 19/14
(52) U.S. Cl. .................... 704/200.1; 704/201; 704/211; 704/213
(58) Field of Search .............................. 704/200.1, 201, 704/500, 230

(56) References Cited

U.S. PATENT DOCUMENTS

| | | | | |
|---|---|---|---|---|
| 3,872,503 A | * | 3/1975 | Shutterly | ............... 704/201 |
| 5,222,189 A | * | 6/1993 | Fiedler | ................. 704/230 |
| 5,394,473 A | * | 2/1995 | Davidson | ................ 704/200.1 |
| 5,451,954 A | * | 9/1995 | Davis et al. | ............. 704/200.1 |
| 6,226,608 B1 | * | 5/2001 | Fiedler et al. | ........... 704/200.1 |

FOREIGN PATENT DOCUMENTS

FR 95 13943 11/1995 ............. G10L/9/14

OTHER PUBLICATIONS

ISO/IEC, *Information technology—Coding of moving pictures and associated audio for digital storage media at up to about 1,5 Mbit/s*. 1993.

ISO/IEC, *Information technology–Generic coding of moving pictures and associated audio information–*, 1997.

M. Zoller, E. Zuricher, *Elehtroahustih*, Springer–Verlag, Berlin, Heidelberg, New York, 3. Auglage, 1993.

* cited by examiner

Primary Examiner—Richemond Dorvil
Assistant Examiner—Daniel Nolan
(74) Attorney, Agent, or Firm—Michael A. Glenn; Kirk D. Wong

(57) ABSTRACT

A method for detecting a transient in a discrete-time audio signal is performed completely in the time domain and includes the step of segmenting the discrete-time audio signal as to generate consecutive segments of the same length with unfiltered discrete-time audio signals. The discrete-time audio signal in a current segment is filtered. Either the energy of the filtered discrete-time audio signal in the current segment is compared with the energy of the filtered discrete-time audio signal in a preceding segment or a current relationship between the energy of the filtered discrete-time audio signal in the current segment and the energy of the unfiltered discrete-time audio signal in the current segment is formed and this current relationship compared with a preceding corresponding relationship. Whether a transient is present in the discrete-time audio signal is detected using one and/or the other of these comparisons.

15 Claims, 2 Drawing Sheets

METHOD AND DEVICE FOR DETECTING A TRANSIENT IN A DISCRETE-TIME AUDIOSIGNAL

FIELD OF THE INVENTION

The present invention relates to the coding of audio signals and in particular to the coding of audio signals which exhibit transients (or "attacks").

BACKGROUND OF THE INVENTION AND DESCRIPTION OF PRIOR ART

In hearing-adjusted coding for the data reduction of audio signals the coding of the audio signals usually takes place in the frequency domain. This means that output values of a time-frequency transform are quantized and are then written into a bit stream, which can be stored or transmitted. A psychoacoustic model, which is implemented in the coder, calculates an instantaneous masked hearing or masking threshold and controls the quantization of the output values of the time-frequency transform in such a way that the coding error, i.e. the quantization error, is spectrally shaped and lies below this threshold so that the error is inaudible. As a result of this measure, however, the coding error is constant in time over the number of sampled values corresponding to the length of the transform window. The masked hearing or masking threshold is described in M. Zollner, E. Zwicker, Elektroakustik, Springer-Verlag, Berlin, Heidelberg, N. Y., 3rd edn, 1993.

To enable the calculation of the masked hearing threshold in the frequency domain to be performed as exactly as possible, a high frequency resolution of the time-frequency transform is necessary. In practical application instances, typical transform lengths in the range from 20 to 40 ms can occur.

If transient audio signals, i.e. audio signals with transients, are processed, the quantization noise may distribute itself "before" the maximum of the signal envelope curve, depending on the temporal position of the transient in the transform window. The nature of human perception is such that these so-called "pre-echos" can become audible if they occur more than 2 ms before the actual transient of the audio signal to be coded. This is the reason why, in many transform coders, the transform length of the time-frequency transform can be switched over to shorter windows, i.e. shorter block lengths, having a time length of typically 5 to 8 ms and consequently a higher time resolution. This enables a finer temporal shaping of the quantization noise and thus a suppression of these pre-echos, whereby these are no longer, or only very slightly, audible when the coded signal is decoded again in a decoder.

Devices for detecting a transient in an audio signal are thus used to match the transform length of the time-frequency transform to the properties, and in particular to the transient properties, of the audio signal as required by the human ear.

FIG. 3 shows a known transform coder 100, which is in general implemented according to the Standard MPEG 1–2 Layer 3 (ISO/IEC IS 11172-3, Coding of Moving Pictures and Associated Audio, Part 3: Audio). A time signal arrives via an input 102 at a block Time/frequency transform 104. The time signal at input 102, which is typically a discrete-time audio signal obtained from a continuous-time time signal by means of a sampling device (not shown), is transformed by the block Time/frequency transform 104 into consecutive blocks of spectral values, which are passed to a block Quantization/coding 106, the output signal of the block Quantization/coding consisting of quantized and redundancy-coded digital signals which, in a block Bit stream formatting 108, are, together with necessary side information, formed into a bit stream, which appears at the output of the bit stream formatter 108 and which can be stored or transmitted.

The discrete-time audio signals at the input 102 are windowed in the block Time/frequency transform 104 so as to generate consecutive blocks with discrete-time windowed audio signals. The blocks of windowed discrete-time audio signals are subsequently, as already mentioned, transformed into the frequency domain. As is known from the field of telecommunications, the frequency resolution of the time-frequency transform is determined by the length of a block. To achieve sufficient time resolution for discrete-time audio signals with transient parts, the window length and thus the time length of a block of discrete-time sampled values must be shortened when coding these signals in order to avoid the pre-echos.

The known coder shown in FIG. 3 performs the following method for detecting transients in an audio signal. From the block Time/frequency transform 104 the spectral components are fed into a block Psychoacoustic model 110, the block 110 establishing on the one hand, as already mentioned at the outset, the masking or masked hearing threshold for the block Quantization/coding 106 and, on the other, from the signal energy characteristic of the discrete-time audio signal in the frequency domain and the calculated energy characteristic of the masked hearing threshold, an estimated value for the bit demand for coding the spectrum. The estimated bit demand, which experts also refer to as "perceptual entropy" ("pe" for short), is calculated from the following relationship:

$$pe = \sum_{k=1}^{N} \frac{1}{2}\log_2\left(\frac{e(k)}{n(k)} + 1\right) \qquad (1)$$

In equation (1) N is the number of spectral lines of a block, e(k) is the signal energy of the spectral components or spectral lines k and n(k) is the permitted interference energy of the line k. A rise in this perceptual entropy from one transform window to the next which exceeds a certain threshold value, designated as "switch_pe", serves here to indicate a transient. If the threshold value switch_pe is exceeded, a switch over from a long window to a short window is effected in the block 104 so as to generate temporally shorter blocks of discrete-time audio signals in order to increase the time resolution of the transform coder 100. The calculation rule depicted in equation (1) and the specification of the threshold value switch_pe are stipulated in a block Bit demand estimation 112. The result of the bit demand estimation 112 is communicated to the time/frequency transform 104 and to the psychoacoustic model 110, as is indicated in FIG. 3.

A disadvantage of this known method is that the information on a possible transient or "attack" is not available until after the psychoacoustic model has been calculated. This has a particularly adverse effect on the temporal sequence structure of the coder, since the window information has to be fed back to the psychoacoustic model. Furthermore, changes in the parameters for calculating the masked hearing threshold always affect the value of the perceptual entropy. Changes in these parameters thus always entail changes in the window sequence, i.e. the sequence of long and short windows, of the transform.

FIG. 4 shows another known transform coder 150, which is essentially similar in design to the transform coder 100. In particular the same also has the input 102 for discrete-time audio signals, which are windowed and transformed into the frequency domain in the block 104. Taking account of the psychoacoustic model 110, the spectral output values of the block 104 are quantized and then coded in the block 106 and are written, together with side information, into an output bit stream by the bit stream formatter 108.

The transform coder 150 shown in FIG. 4 differs from the transform coder 100 shown in FIG. 3 in the detection of transients in the audio signal. The detection of transients in the audio signal at input 102 which is shown in FIG. 4 is described in the standard MPEG 2 AAC (see ISO/IEC IS 13818-7, Annex B, 2.1, MPEG-2 Advanced Audio Coding (AAC)). The block FFT transform and detection from the spectrum 152 performs detection of transients by means of a spectral energy rise. In particular, the discrete-time audio signal at input 102 is first transformed into the frequency domain by means of an FFT transform, the length of the FFT transform corresponding here to the transform length of the short windows. Then the FFT energies in the so-called "critical bands" are calculated. The "critical bands" constitute a frequency grouping which corresponds to the resolution of the psychoacoustic model. A threshold value comparison of the individual band energies over one or more consecutive windows now provides an indication of a transient.

In contrast to the known method shown in FIG. 3, the known method shown in FIG. 4 avoids the disadvantage of feeding back the window information to the psychoacoustic model 110. The method shown in FIG. 4, could, in principle, be used independently of the psychoacoustic model prior to its calculation. The method shown in FIG. 4 normally employs an FFT transform which is adapted to the transform energies in the individual frequency groups. Furthermore, if a real-time implementation of the coder is required, the Fourier transform performed specially for transient detection is too costly, i.e. requires too high a computational effort in a digital signal processor (DSP), an effort which would be better exploited elsewhere in the coder, e.g. for quantization, for windowing or in the psychoacoustic model.

SUMMARY OF THE INVENTION

It is the object of the present invention to provide a method and a device for detecting a transient in a discrete-time audio signal and a method and a device for coding audio signals which enable reliable detection of transients, and thus simple suppression of pre-echos, in an efficient and simple way. [This object is achieved by a method for detecting a transient according to claim 1, by a device for detecting a transient according to claim 11, by a device for coding a discrete-time audio signal according to claim 14 and by a method for coding a discrete-time audio signal according to claim 15].

In accordance with a first aspect of the present invention, this object is achieved by a method for detecting a transient in a discrete-time audio signal, comprising the following steps:

(a) segmenting the discrete-time audio signal so as to generate consecutive segments of the same length with unfiltered discrete-time audio signals;

(b) filtering the discrete-time audio signal in a current segment, so as to obtain a filtered discrete-time audio signal wherein lower frequency spectral components are attenuated;

(c) comparing the energy of the filtered discrete-time audio signal in the current segment with the energy of the filtered discrete-time audio signal in a preceding segment; and/or (d) determining a current relationship between the energy of the filtered discrete-time audio signal in the current segment and the energy of the unfiltered discrete-time audio signal in the current segment and comparing the current relationship with a corresponding preceding relationship; and (e) detecting a transient on the basis of the comparison performed in step (c) and/or (d).

In accordance with a second aspect of the present invention. this object is achieved by a device for detecting a transient in a discrete-time audio signal, comprising:

(a) a segment generator for segmenting the discrete-time audio signal so as to generate consecutive segments of the same length with unfiltered discrete-time audio signals;

(b) a filter for filtering the discrete-time audio signal in a current segment. so as to obtain a filtered discrete-time audio signal wherein lower frequency spectral components are attenuated;

(c) a rise detector for comparing the energy of the filtered discrete-time audio signal in the current segment with the energy of the filtered discrete-time audio signal in a preceding segment; and/or (d) a spectral detector for determining a current relationship between the energy of the filtered discrete-time audio signal in the current segment and the energy of the unfiltered discrete-time audio signal in the current segment and comparing the current relationship with a preceding corresponding relationship; and (e) a transient detector for detecting a transient on the basis of the comparison performed by the rise detector and/or by the spectral detector.

In accordance with a third aspect of the present invention. this object is achieved by a device for coding a discrete-time audio signal, comprising:

(a) a transient detector for detecting a transient in the discrete-time audio signal comprising;

a segment generator for segmenting the discrete-time audio signal so as to generate consecutive segments of the same length with unfiltered discrete-time audio signals;

a filter for filtering the discrete-time audio signal in a current segment so as to obtain a filtered discrete-time audio signal wherein lower frequency spectral components are attenuated;

a rise detector for comparing the energy of the filtered discrete-time audio signal in the current segment with the energy of the filtered discrete-time audio signal in a preceding segment; and/or a spectral detector for determining a current relationship between the energy of the filtered discrete-time audio signal in the current segment and the energy of the unfiltered discrete-time audio signal in the current segment and comparing the current relationship with a preceding corresponding relationship; and a transient detector for detecting a transient on the basis of the comparison performed by the rise detector and/or by the spectral detector;

(b) a block generator for windowing the discrete-time audio signal so as to generate blocks of discrete-time audio signals which responds to the transient detector so as to use a short window for windowing when the transient detector detects a transient;

(c) a time/frequency transformer for time/frequency transforming the blocks of the discrete-time audio signal so as to generate blocks of spectral components; and (d) a guantizer and coder for quantizing and coding the blocks of spectral components.

In accordance with a fourth aspect of the present invention, this object is achieved by a method for coding a discrete-time audio signal, comprising the following steps:

(a) detecting a transient by segmenting the discrete-time audio signal so as to generate consecutive segments of the same length with unfiltered discrete-time audio signals;

filtering the discrete-time audio signal in a current segment so as to obtain a filtered discrete-time audio signal wherein lower frequency spectral components are attenuated;

comparing the energy of the filtered discrete-time audio signal in the current segment with the energy of the filtered discrete-time audio signal in a Preceding segment; and/or determining a current relationship between the energy of the filtered discrete-time audio signal in the current segment and the energy of the unfiltered discrete-time audio signal in the current segment and comparing the current relationship with a corresponding preceding relationship; and detecting a transient on the basis of the comparison performed in the step of determining and/or the comparison performed in the step of comparing;

(b) windowing the discrete-time audio signal with a short window when a transient has been detected and with a long window when no transient has been detected so as to generate blocks of discrete-time audio signals;

(c) transforming the blocks of the discrete-time audio signal from the time domain into the frequency domain so as to generate blocks with spectral components; and (d) quantizing and coding the blocks of spectral components so as to obtain a coded audio signal.

The present invention is based on the finding that a transient in an audio signal is accompanied by a temporal rise in the signal energy of the audio signal. Furthermore, a transient leads to a rise in the energy of higher frequency signal components in the audio signal, since a transient is typically characterized by rapid temporal changes of the audio signal.

[A method for detecting a transient in a discrete-time audio signal thus comprises the following steps:

(a) segmenting the discrete-time audio signal so as to generate consecutive segments of the same length with unfiltered discrete-time audio signals;

(b) filtering the discrete-time audio signal in a current segment;

(c) comparing the energy of the filtered discrete-time audio signal in the current segment with the energy of the filtered discrete-time audio signal in a preceding segment; and/or (d) determining a current relationship between the energy of the filtered discrete-time audio signal in the current segment and the energy of the unfiltered discrete-time audio signal in the current segment and comparing the current relationship with a corresponding preceding relationship; and (e) detecting a transient on the basis of the comparison performed in step (c) and/or in step (d).]

In a preferred embodiment the filtering is performed by means of a high-pass filter; other forms of filtering are possible, however, e.g. by means of a band pass filter, a differentiator of the first or higher order or similar, provided the filtered discrete-time audio signal differs from the unfiltered discrete-time audio signal in respect of its spectral properties.

The comparison carried out in step (c) of the method in accordance with the first aspect of the present invention serves to detect a temporal rise in the signal energy, i.e. for rise detection, whereas the comparison carried out in step (d) of the method-in accordance with the first aspect of the present invention serves to detect the rise of signal components of a particular frequency range, i.e. for spectral detection.

The comparison performed in step (d) of the method in accordance with the first aspect of the present invention serves to take frequency-dependent effects of the temporal masking into account.

It should be pointed out here that the time resolution of the human ear is frequency dependent. Roughly speaking, the time resolution is relatively small at very low frequencies and grows as the frequency increases. In the case of a pre-echo this means that noise introduced by the quantization and causing a pre-echo at a certain time interval prior to a transient will scarcely be detected at low frequencies since the ear has here a time resolution which is coarser than the particular time interval of the pre-echo. The situation is different in the case where a transient occurs in the higher frequency range. Here the time resolution of the human ear is finer, so that a pre-echo at the particular time interval may be audible since the time resolution of the ear may already be finer than the time interval between the pre-echo and the transient. It should be noted therefore that the spectral detection, in contrast to the rise detection, duplicates the frequency-dependent time resolution of the ear, with the result that a more precise transient detection is possible than with the rise detection alone. In some cases the rise detection on its own can, of course, also produce results which are already satisfactory.

It should be noted here that a transient can be detected either on the basis of the comparison made in step (c) of the method in accordance with the first aspect of the present invention or on the basis of the comparison made in step (d) of the method in accordance with the first aspect of the present invention or on the basis of both comparisons.

BRIEF DESCRIPTION OF THE DRAWINGS

Preferred embodiments of the present invention will be described in more detail below making reference to the enclosed drawings, in which.

DETAILED DESCRIPTION OF PREFERRED EMBODIMENTS

Figure 1:
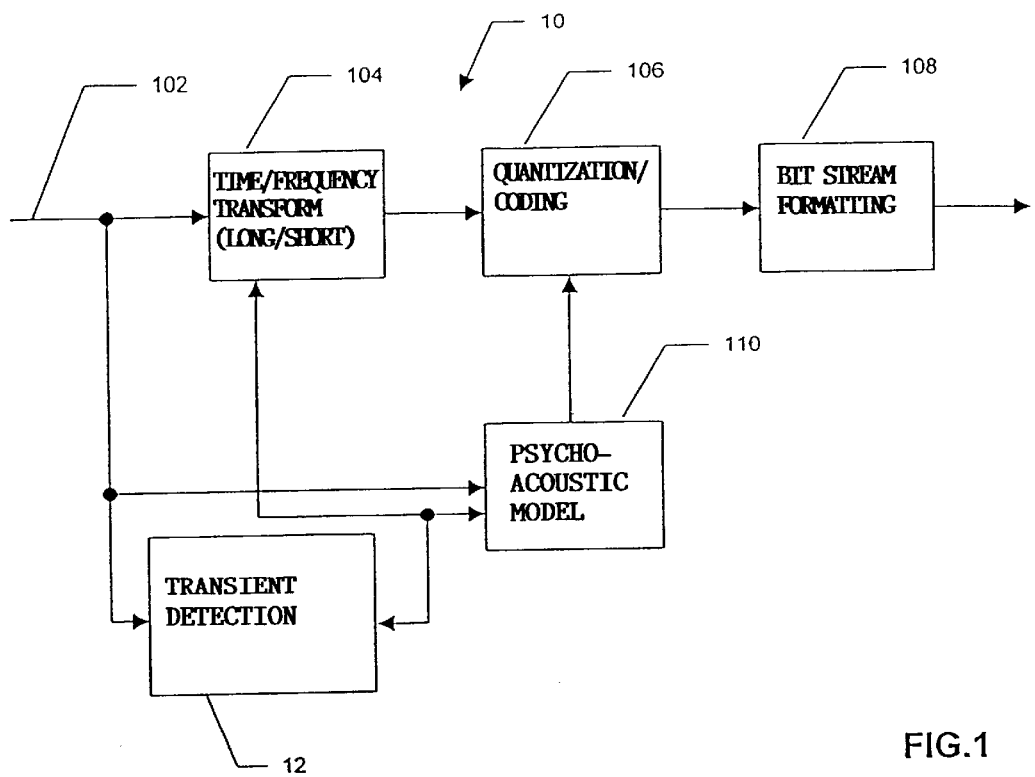
FIG. 1 shows a transform coder which comprises the transient detection in the time domain.
Figure 3:
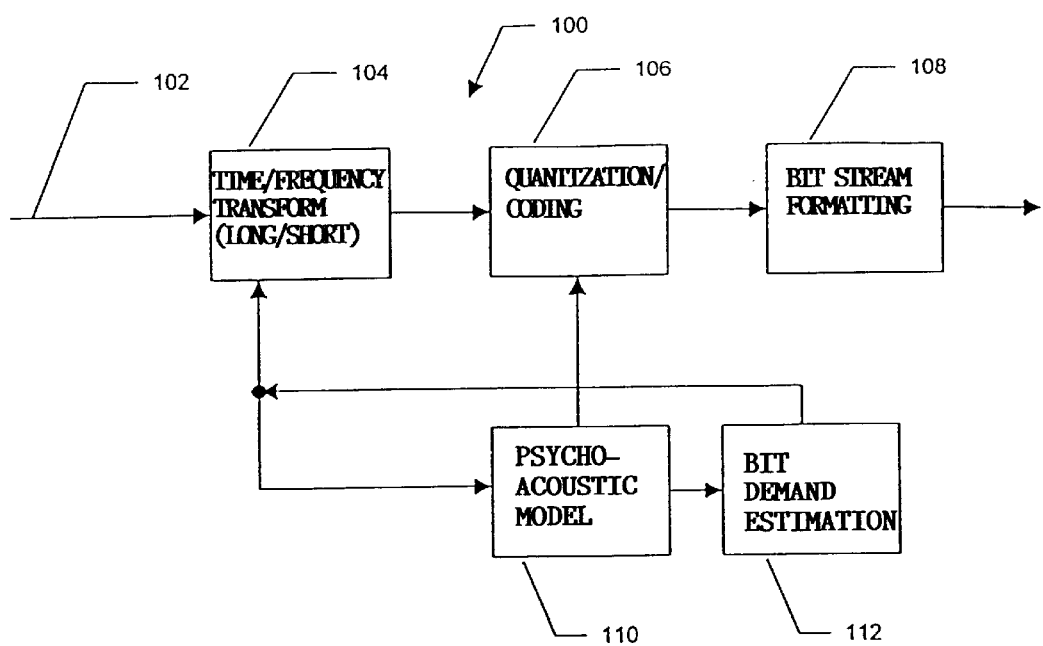
FIG. 3 shows a transform coder which comprises a known method for the transient detection.
Figure 4:
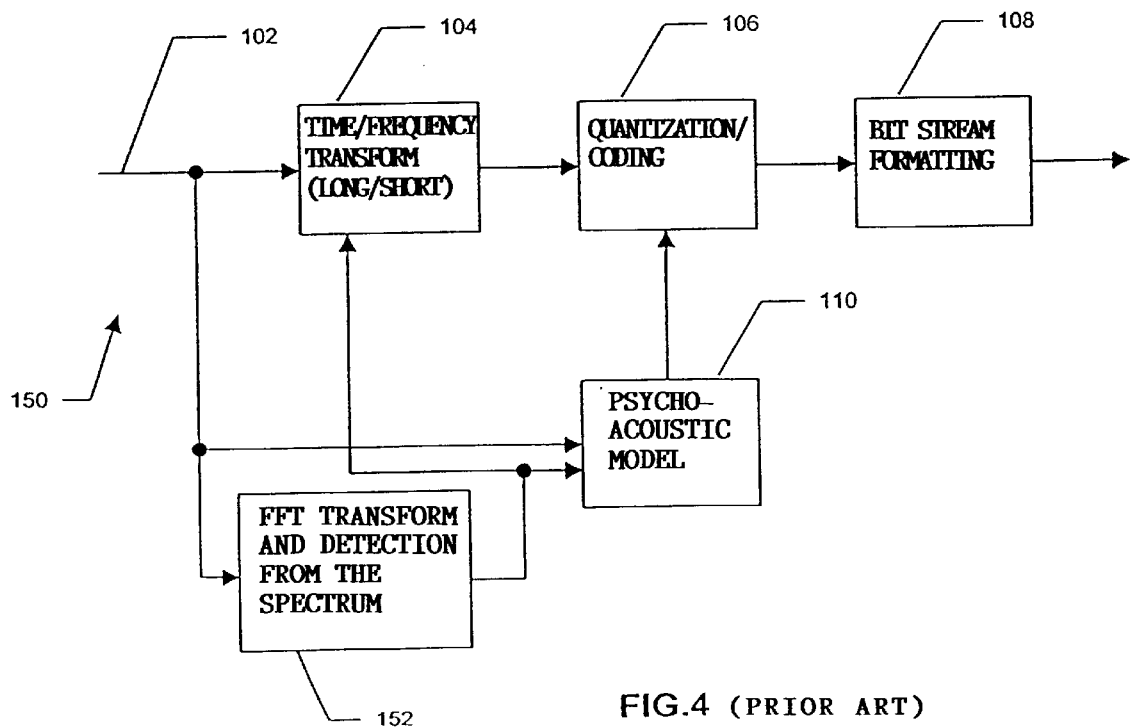
FIG. 4 shows a further transform coder which presents a different known method for the transient detection.

FIG. 1 shows a transform coder 10 according to the present invention which, apart from a block Transient detection 12, does not differ from the known transform coders customary in the field of technology. In particular, the functions and linking of the blocks Time/frequency transform 104, Quantization/coding 106, Bit stream formatting 108 and Psychoacoustic model 110 are known in the field of technology. The mode of operation of the individual blocks has already been described in connection with FIG. 3 and 4 and will not therefore be explained explicitly again.

As is shown in FIG. 1, the block Transient detection 12 receives the discrete-time audio signal as input signal via the input 102 of the transform coder 10. The output signal of the block Transient detection 12 is a signal which indicates whether a long or short window is to be specified for the windowing and subsequent time-frequency transform 104.

Figure 2:
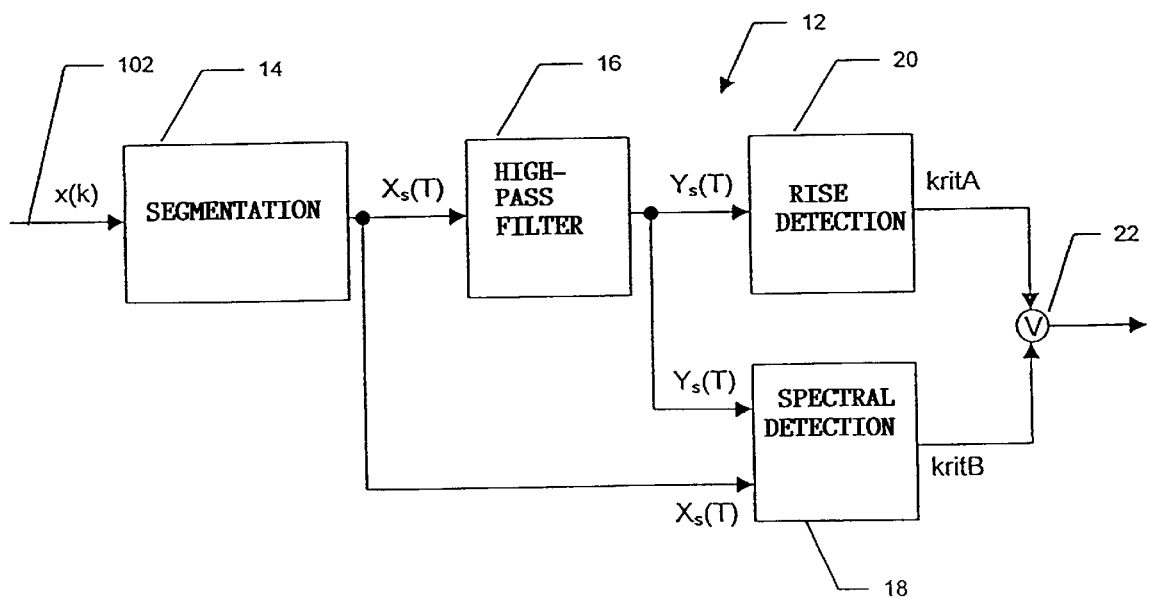
FIG. 2 shows a detailed representation of the transient detection in the time domain contained in FIG. 1.

FIG. 2 shows a detailed view of the block Transient detection 12 of FIG. 1. The discrete-time audio signal x(k), which is present at the input 102 of the transform coder 10 (FIG. 1), is fed into a segmenter 14, which supplies consecutive segments of length S at its output. A segment thus comprises the number S of discrete-time sampled values of the audio signal and is denoted by $x_s(T)$, where "T" indicates that for the signal $x_s(T)$ it is the current segment that is involved, while "T−1" indicates that the segment which immediately precedes the current segment chronologically is involved. "T−2" signifies by analogy that the segment with "T−2" is the next to last segment before the current segment.

The signal $x_s(t)$ is fed into a high-pass filter 16 on the one hand and into a spectral detector 18 on the other. The output signal $y_s(t)$ of the high-pass filter 16 in turn is fed into a rise detector 20 on the one hand and into the spectral detector 18 on the other. The output signal of the rise detector 20 and the output signal of the spectral detector 18 are passed on to a transient detector 22, which may be implemented as an OR gate, as is indicated symbolically by the symbol "v" in FIG. 2. The output signal of the transient detector 22 corresponds to the output signal of the transient detector 12 of FIG. 1 and is made available to the block Time/frequency transform 104 and to the block Psychoacoustic model 110.

The operation and design of the individual elements shown in FIG. 2 will now be discussed.

The segmenter 14 divides the input signal x(k) into consecutive segments $x_s(T)$, $x_s(T−1)$, $x_s(T−2)$, . . . of the same length S. The discrete-time audio signal $x_s(T)$ in a current segment (T) thus comprises S discrete-time sampled values of the discrete-time audio signal x(k) at the input 102, where the segment length S can be chosen independently of the block length of the time/frequency transform. In particular, in contrast to the prior art, it is not necessary to choose e.g. the short block length or the long block length as the segment length. The segment length S can lie in the range from 200 up to 2000 sampled values, a segment length of about 500 sampled values being preferred.

The high-pass filter 16 essentially performs two tasks. The rise detection (block 20) should detect a rise in the envelope curve of the signal energy, not however follow the amplitude characteristic of a low-frequency signal. Now, if the oscillation period of a signal component is of the same order of magnitude as the segment length or above, a false detection of a transient would occur in certain circumstances. The frequency response of the high-pass filter 16 should thus preferably possess sufficient stop-band attenuation in the lower frequency range. With increasing sequence length S, moreover, the cut-off frequency of the filter can be lowered still further. On the other hand, the energies of the high-pass filtered time signal $y_s(T)$ are still required as the measure of comparison for the spectral detection (block 18).

As far as the edge steepness and ripple in the pass band are concerned, the filter can exhibit very moderate properties, though a linear phase behaviour is preferred. For a preferred segment length of about 500 sampled values, a non-recursive linear-phase FIR filter of length 7 with the filter coefficients −0.2136, −0.0257, −0.0265, −0.5713, −0.0265, −0.0257, −0.2136 will be used in a preferred embodiment of the present invention. The length of the FIR filter of the preferred embodiment is not, however, restricted to the quoted value. In many cases filters with shorter length should suffice, while in other cases significantly more filter coefficients may well be desired.

Furthermore it is preferable that the filter length should be small compared to the segment length S. The reason is that in this case the filter delay time can be neglected, whereby further complexity of the transform coder 10 can be avoided.

The segments are freed from low-frequency components by means of a non-recursive digital filter, as has already been referred to, having a very short filter length compared to the segment length. The following equation results for the output sequence of the filter $y_s(T)$:

$$y_S(T) = x_S(T) * h(k) \qquad (2)$$

h(k) in equation (2) represents the pulse response of the filter, while k corresponds to the filter length. The output signal $y_s(T)$ results therefore from the convolution of the input signal $x_s(T)$ with the pulse response h(k) of the high-pass filter 16.

In the rise detector 20 the energy $E_f(T)$ of the segment which is present at that moment, which is also called the current segment, is first calculated from the filtered input data $y_s(T)$ via a scalar product. A comparison with the energy $E_f(T−1)$ of the segment preceding the current segment and with the energy $E_f(T−2)$ of the next to last preceding segment then supplies the criterion for the energy rise in the discrete-time audio signal from one segment to the next. The expression for the first criterion or kritA thus reads as follows:

$$kritA = [E_f(T) > k_1 \cdot E_f(T-1)] \wedge [E_f(T) > k_2 \cdot E_f(T-2)] \wedge [E_f(T) > E_{minF}] \qquad (3)$$

In accordance with the usual notation, "v" denotes a logical OR operation while "Λ" denotes a logical AND operation. The last term of equation (3) describes a comparison of the current energy of the high-pass-filtered discrete-time audio signal in the current segment with a filter minimum energy $E_{minF}$. This comparison has the effect that the criterion A is only taken into account if the current segment energy exceeds a minimum energy. The value of the constant $E_{minF}$ can be specified in advance and is based in a simplified fashion on the influence of the quiescent hearing threshold on perception. The minimum energy for the constant value $E_{minF}$ can thus preferably lie in the region of −80 dBFs.

The spectral detection performed in block 18 on the other hand is based on a comparison of filtered and unfiltered segment energies of the current segment with filtered and unfiltered segment energies of the preceding segment. Expressed in the form of an equation, this leads to the following rule for the second criterion kritB:

$$kritB = \left[ \frac{E_f(T)}{E_u(T)} > k_3 \cdot \frac{E_f(T-1)}{E_u(T-1)} \right] \wedge [E_u(T) > E_{minU}] \qquad (4)$$

In this equation $E_u(T)$ represents the energy of the current unfiltered segment, while $E_f(T)$ represents the energy of the high-pass-filtered current segment, i.e. the energy of the high-pass-filtered discrete-time audio signal in the current segment. The last term of equation (4) again takes account of the case that no window switch over is triggered if the energy of the unfiltered discrete-time audio signal in the current segment lies below a minimum energy $E_{minU}$ for unfiltered signals, which in turn is based on the quiescent hearing threshold and like the filter minimum energy $E_{minF}$ can take a value of −80 dBFs.

In the equations (3) and (4) various constants $k_1$ to $k_3$ are also cited. By means of these constants it is specified how much greater the energy of the current segment, or the current relationship between filtered energy and unfiltered energy, must be compared to the corresponding value for the preceding segment for a transient to be detected through which a window switch over from long to short windows is effected.

In practice the value four has proved to be favourable for the constants $k_1$ and $k_3$, which thus correspond to a level difference of 6 dB. only preferably can the constant $k_2$, i.e. the comparison value with the next to last segment energy, also be chosen somewhat smaller than four, so as to adopt a value of three, for example. It is pointed out, however, that the values of the constants $k_1$ to $k_3$ can be set to other values than those cited if a finer or coarser transient detection is desired. For correct operation of the transient detection of the present invention it is, however, necessary that the values of the constants $k_1$ to $k_3$ are set to values greater than one, as can be seen from the equations (3) and (4).

It should be pointed out here that the criterion A (kritA) and the criterion B (kritB) can be based solely on the respective first term of the equations (3) and (4). The other two terms in equation (3) and the other term in equation (4) serve merely to achieve a more refined transient detection in order to ensure that as few transients as possible are detected, so that switch over to the short transform windows has to be made as infrequently as possible.

In order to minimize the effect of beats on the rise detection it is desirable to compare the filtered energy not only with the chronologically preceding segment energy $E_f(T-1)$ but also with the next to last energy value $E_f(T-2)$ for the chosen segment length. Here account is taken of the effect of temporal post-masking for transients in quick succession when a potential pre-echo before a second transient is masked by the first transient. The second term in equation (3) does not represent an important term for the operation of the present invention but simply an advantageous embodiment. The same holds true for the respective last terms of the equations (3) and (4), which make the detection of a transient dependent on minimum energies which reflect the quiescent threshold.

It should be stressed once again here that the use of the high-pass filter, though preferred, serves only as an example. Instead of the high-pass filter a differentiator could equally well be used, which, speaking generally, leads to higher frequency signal components being more strongly represented in the differentiated signal than in the non-differentiated signal. A further alternative to the high-pass filter would be a band pass filter, which results in the energy of the band pass-filtered signal being concentrated in a particular spectral range. This enumeration of the alternatives to the high-pass filter of the preferred embodiment is not exhaustive, however. What the method of the present invention requires is that the signal be processed, i.e. filtered, in the time domain, this occurring in such a way that the spectral properties of this signal differ from those of the unprocessed, i.e. unfiltered, signal. The term "filtering" is thus not to be understood in the limited sense that it encompasses just a conventional filtering, e.g. by means of a high-pass filter, but that it also encompasses other methods of processing, such as e.g. differentiations, which result in the processed signal having different spectral properties than those of the unprocessed signal.

Furthermore it should be stressed that the device 22 for detecting a transient need not necessarily be implemented as an OR gate. It can also be implemented as an AND gate, for example. In this case a transient will only be detected when both criteria are fulfilled. In this case the constants $k_1$, $k_2$ and/or $k_3$ and/or the minimum energies would preferably be decreased, with the consequence that each individual criterion is fulfilled more easily. To avoid unnecessary or too frequent switchovers to shorter windows, however, a transient is then only detected when both criteria are detected simultaneously in a segment.

The present invention thus provides detection of transients in audio signals from the time signal sequence, which occurs exclusively in the time domain. The transient detection thus provides the advantage over the prior art that no FFT with a predetermined transform length is required. The method according to the present invention can therefore be implemented very economically as regards the available computing resources since the FIR filter is easily realized.

What is claimed is:

1. A method for detecting a transient in a discrete-time audio signal, comprising the following steps:
    (a) segmenting the discrete-time audio signal so as to generate consecutive segments of the same length with unfiltered discrete-time audio signals;
    (b) filtering the discrete-time audio signal in a current segment, so as to obtain a filtered discrete-time audio signal wherein lower frequency spectral components are attenuated;
    (c) comparing the energy of the filtered discrete-time audio signal in the current segment with the energy of the filtered discrete-time audio signal in a preceding segment;
    (d) determining a current relationship between the energy of the filtered discrete-time audio signal in the current segment and the energy of the unfiltered discrete-time audio signal in the current segment and comparing the current relationship with a corresponding preceding relationship; and
    (e) detecting a transient on the basis of the comparison performed in steps (c) and (d).

2. A method according to claim 1, wherein the step of filtering comprises a high-pass filtering of the discrete-time audio signal.

3. A method according to claim 1 or 2, wherein in step (e) a transient is detected if the comparison performed in step (c) shows that the energy ($E_f(T)$) of the filtered discrete-time audio signal ($y_s(T)$) in the current segment is greater than the energy ($E_f(T-1)$) of the filtered discrete-time audio signal ($y_s(T-1)$) in a preceding segment.

4. A method according to claim 1 or 2,
    wherein in step (c) in addition the energy ($E_f(T)$) of the filtered discrete-time audio signal ($y_s(T)$) in the current segment is compared with the energy ($E_f(T-2)$) of a filtered discrete-time audio signal ($y_s(T-2)$) in a next to last preceding segment, and
    wherein in step (e) a transient is only detected if the energy ($E_f(T)$) of the filtered discrete-time audio signal ($y_s(T)$) in the current segment is greater than the energy ($E_f(T-1)$) of the filtered discrete-time audio signal ($y_s(T-1)$) in the preceding segment and is also greater than the energy ($E_f(T-2)$) of the filtered discrete-time audio signal ($y_s(T-2)$) in the next to last preceding segment.

5. A method according to claim 1 or 2,
    wherein in step (c) in addition the energy of the filtered discrete-time audio signal in the current segment is compared with a predetermined filter minimum value ($E_{minF}$) which is based on the psychoacoustic quiescent hearing threshold, and wherein in step (e) a transient is only detected if the energy of the filtered discrete-time audio signal in the current segment is greater than the energy of the filtered discrete-time audio signal in the preceding segment and is also greater than the energy of the filtered discrete-time audio signal in the next to last preceding segment and is also greater than the predetermined filter minimum value ($E_{minF}$).

6. A method according to one of the preceding claims, wherein the energies which are respectively compared with the energy of the filtered discrete-time audio signal in the current segment are weighted with factors ($k_1$, $k_2$) which are greater than one.

7. A method according to one of the preceding claims, wherein in step (e) a transient is detected if the comparison performed in step (d) shows that the current relationship is greater than the preceding corresponding relationship.

8. A method according to one of the claims 1 to 6,
wherein in step (e) in addition the energy ($E_u(T)$) of the unfiltered discrete-time audio signal ($x_S(T)$) in the current segment is compared with a predetermined minimum value ($E_{minU}$) which is based on the psychoacoustic quiescent hearing threshold, and
wherein in step (e) a transient is only detected if the current relationship is greater than the corresponding preceding relationship and if the energy ($E_u(T)$) of the unfiltered discrete-time audio signal ($x_S(T)$) in the current segment is greater than the predetermined minimum value ($E_{minU}$).

9. A method according to claim 7 or 8, wherein the preceding relationship is weighted with a predetermined factor ($k_3$) which is greater than one.

10. A method according to one of the preceding claims, wherein the high-pass filtering is performed by means of an FIR filter.

11. A device for detecting a transient in a discrete-time audio signal, comprising the following features:
(a) a segment generator for segmenting the discrete-time audio signal so as to generate consecutive segments of the same length with unfiltered discrete-time audio signals;
(b) a filter for filtering the discrete-time audio signal in a current segment, so as to obtain a filtered discrete-time audio signal wherein lower frequency spectral components are attenuated;
(c) a rise detector for comparing the energy of the filtered discrete-time audio signal in the current segment with the energy of the filtered discrete-time audio signal in a preceding segment;
(d) a spectral detector for determining a current relationship between the energy of the filtered discrete-time audio signal in the current segment and the energy of the unfiltered discrete-time audio signal in the current segment and comparing the current relationship with a preceding corresponding relationship; and
(e) a transient detector for detecting a transient on the basis of the comparison performed by the rise detector and by the spectral detector.

12. A device (12) according to claim 11, wherein the filter (16) is a high-pass FIR filter with linear phase behaviour.

13. A device according to claim 11 or 12, wherein the means (22) for detecting a transient is implemented as an AND gate or an OR gate and output signals (kritA, krit B) of the rise detector (20) and of the spectral detector (18) are fed into inputs of the OR gate or the AND gate.

14. A device for coding a discrete-time audio signal, comprising the following features:

(a) a transient detector for detecting a transient in the discrete-time audio signal comprising:
a segment generator for segmenting the discrete-time audio signal so as to generate consecutive segments of the same length with unfiltered discrete-time audio signals;
a filter for filtering the discrete-time audio signal in a current segment, so as to obtain a filtered discrete-time audio signal wherein lower frequency spectral components are attenuated;
a rise detector for comparing the energy of the filtered discrete-time audio signal in the current segment with the energy of the filtered discrete-time audio signal a preceding segment;
a spectral detector for determining a current relationship between the energy of the filtered discrete-time audio signal in the current segment and the energy of the unfiltered discrete-time audio signal in the current segment and comparing the current relationship with a preceding corresponding relationship; and
a transient detector for detecting a transient on the basis of the comparison performed by the rise detector and by the spectral detector;
(b) a block generator for windowing the discrete-time audio signal so as to generate blocks of discrete-time audio signals which responds to the transient detector so as to use a short window for windowing when the transient detector detects a transient;
(c) a time/frequency transformer for time/frequency transforming the blocks of the discrete-time audio signal so as to generate blocks of spectral components; and
(d) a quantizer and coder for quantizing and coding the blocks of spectral components.

15. A method for coding a discrete-time audio signal, comprising the following steps:
(a) detecting a transient by:
segmenting the discrete-time audio signal so as to generate consecutive segments of the same length with unfiltered discrete-time audio signals;
filtering the discrete-time audio signal in a current segment so as to obtain a filtered discrete-time audio signal wherein lower frequency spectral components are attenuated;
comparing the energy of the filtered discrete-time audio signal in the current segment with the energy of the filtered discrete-time audio signal in a preceding segment;
determining a current relationship between the energy of the filtered discrete-time audio signal in the current segment and the energy of the unfiltered discrete-time audio signal in the current segment and comparing the current relationship with a corresponding preceding relationship; and
detecting a transient on the basis of the comparison performed in the step of determining and the comparison performed in the step of comparing;
(b) windowing the discrete-time audio signal with a short window when a transient has been detected and with a long window when no transient has been detected so as to generate blocks of discrete-time audio signals;
(c) transforming the blocks of the discrete-time audio signal from the time domain into the frequency domain so as to generate blocks with spectral components; and
(d) quantizing and coding the blocks of spectral components so as to obtain a coded audio signal.

* * * * *